United States Patent
Eicken et al.

(10) Patent No.: US 7,420,473 B2
(45) Date of Patent: Sep. 2, 2008

(54) PET ALERT COLLAR

(75) Inventors: Gail Eicken, Tinton Falls, NJ (US);
Gary Eicken, Tinton Falls, NJ (US);
Julianne Sudman, Knoxville, TN (US);
E. Douglas Grindstaff, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 300 days.

(21) Appl. No.: 11/386,283

(22) Filed: Mar. 22, 2006

(65) Prior Publication Data

US 2007/0222624 A1 Sep. 27, 2007

(51) Int. Cl.
*G08B 23/00* (2006.01)

(52) U.S. Cl. .................. 340/573.1; 340/573.3; 340/628

(58) Field of Classification Search ............. 340/573.1, 340/573.3, 539.1, 539.11, 539.13, 506, 628, 340/632, 825.49, 10.2; 702/178, 179
See application file for complete search history.

(56) References Cited

U.S. PATENT DOCUMENTS

| | | | |
|---|---|---|---|
| 507,322 A | 10/1893 | Holmes | |
| 520,395 A | 5/1894 | Edmonds | |
| 1,006,914 A | 10/1911 | Cox | |
| 1,310,612 A | 7/1919 | Eskelin | |
| 4,837,560 A | 6/1989 | Newberry | |
| 5,140,946 A | 8/1992 | Pennock et al. | |
| 5,523,927 A | 6/1996 | Gokey | |
| 5,642,092 A | 6/1997 | Dunne et al. | |
| 5,651,331 A | 7/1997 | Cleri, Jr. | |
| 5,652,563 A | 7/1997 | Maus | |
| 6,318,296 B1 | 11/2001 | Nguyen | |
| 6,394,040 B1 | 5/2002 | Axel | |
| 6,577,234 B1 * | 6/2003 | Dohrmann | 340/540 |
| 6,703,930 B2 * | 3/2004 | Skinner | 340/539.11 |
| 6,710,714 B2 | 3/2004 | Conway | |
| 6,721,681 B1 * | 4/2004 | Christian et al. | 702/178 |
| 6,892,678 B2 | 5/2005 | Cheng | |
| 6,970,090 B1 | 11/2005 | Sciarra | |
| 7,113,099 B2 * | 9/2006 | Tyroler et al. | 340/573.4 |

* cited by examiner

*Primary Examiner*—Van T. Trieu
(74) *Attorney, Agent, or Firm*—Pitts & Brittian, PC (57) ABSTRACT

A pet collar for alerting others as to the location of a pet is provided. The pet collar is provided for announcing the presence, audibly and visibly, of a pet such as in a burning structure or otherwise when the pet cannot be found. The pet collar is adapted to work in cooperation with either a conventional or an improved smoke detector. In one embodiment, a radio frequency (RF) transmitter is used in cooperation with a conventional smoke detector to communicate with a pet collar of the present invention. In either embodiment, when the smoke detector sounds an audible alarm either automatically or manually, the pet collar is activated to sound an alarm and to illuminate at least one light. The pet collar is also useful in cooperation with other detectors such as a carbon monoxide detector or a security alarm.

25 Claims, 7 Drawing Sheets

PET ALERT COLLAR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

The present invention pertains to the field of pet collars. More particularly, this invention is related to a collar adapted to be worn by a pet and on which is provided audible and/or visual alarms useful in locating the pet in a smoke-filled building from which the animal is unable to escape unassisted.

2. Description of the Related Art

In the field of pet care, it is well known that pets face the same dangers as humans when in emergency situations such as house fires. Often, when pets are lost in fires, the loss to the owners is like that of the loss of a family member. However, when in a house fire, it is well known that smoke can quickly consume the dwelling thereby making it difficult both to breathe and see. Because most pets are smaller than humans and often find obscure hiding places, finding them in a smoke-filled structure is often too complicated and dangerous to risk human life in an attempt to find and rescue them.

In order to assist the pet in leaving a dwelling, several devices have been provided for opening an enclosure such as a cage, a pen or a house in which the animal is housed, thus permitting the exit of the pet from the enclosure. Such devices typically respond to the detection of fire or smoke. However, should the devices fail to function to open an exit for the pet from the enclosure, no provision is made for a pet owner, a firefighter, or other rescue worker to locate the pet and remove the pet from danger.

Typical of the art are those devices disclosed in the following U.S. patents:

| U.S. Pat. No. | Inventor(s) | Issue Date |
| --- | --- | --- |
| 507,322 | A. R. Holmes | Oct. 24, 1893 |
| 520,395 | J. S. Edmonds | May 22, 1894 |
| 1,006,914 | C. S. Cox | Oct. 24, 1911 |
| 1,310,612 | E. Eskelin | Jul. 22, 1919 |
| 4,837,560 | C. L. Newberry | Jun. 6, 1989 |
| 5,642,092 | G. Dunne et al. | Jun. 24, 1997 |
| 5,651,331 | C. J. Cleri, Jr. | Jul. 29, 1997 |
| 5,652,563 | A. B. Maus | Jul. 29, 1997 |
| 6,318,296 | T. T. Nguyen | Nov. 20, 2001 |
| 6,710,714 | M. Conway | Mar. 23, 2004 |

Holmes, in his '322 patent, teaches an electric alarm system for use in horse stables. The alarm system is adapted to alert a remote location of a fire in the stable, and will automatically releases the horses housed in the stable in the event a fire is detected. Edmonds, in his '395 patent, as well as Cox in his '914 patent, disclose similar alarm and release systems using mechanical levers and cables. Eskelin ('612) provides yet another system for releasing livestock, the system using a flexible connector that is burnable or capable of being melted. When a fire burns the connector, weights at one end of the connector fall and engage the end of a sliding rod. The rod is connected to the locking devices on the stall gates such that when the rod is so engaged, the rod is slid and the locking devices are unlocked, thereby releasing the livestock.

Newberry, in his '560 patent, discloses an apparatus for automatically unlocking the guard bars on a window in response to the output signal of a fire detection device. A smoke alarm includes a pair of relay-controlled contacts used in conjunction with a solenoid arrangement to unlock the window bars. Power to the smoke detector and the solenoid circuit is supplied by a rechargeable battery.

The '092 patent issued to Dunne et al., teaches an automatic evacuation assistance system for assisting animals or people in existing a structure. The '092 device includes an event detector, such as a smoke detector for providing an event detection signal. The event detection signal is received by an exit control device which is coupled to an exit opening, for allowing the exit opening to open, providing an exit path to the outside of a structure. A transmitter transmits an alert in the form of a sound, smell, or visual signal to attract the person or animals to the exit path and exit opening.

Cleri, Jr., in his '331 patent, teaches an escape device for pets including a passageway opening from the inside to the outside of the enclosure. The passageway is normally closed by a primary door. An apparatus is provided for opening the door at the onset of a smoke emitting emergency such as a fire such that the door is open for safe egress for the pet or pets. Cleri further provides for a pre-recorded message preferably in the owner's voice directing and/or commanding the pet or pets to the open passageway.

The '563 patent issued to Maus discloses a safety system for a stable. The '563 device includes "smart detectors" installed in the stable for detecting at least one abnormal condition in the stable, a siren and/or flashing strobe installed in each stall for spooking horses out of their stalls, an electromagnetic lock provided on each said door, a power source supplying power to each said electro-magnetic lock keeping each door closed in the absence of the abnormal condition, and a controlling means continually monitoring the "smart detectors." Once the abnormal condition has been detected, the controlling unit immediately turns down the power supplied to each electromagnetic lock and, with a certain delay, actuates the siren and/or flashing strobe.

Nguyen, in the '296 patent, teaches an animal holding facility with an automatic evacuation system. An automatic fire, smoke and/or carbon dioxide detection system utilizing a plurality of smoke, fire and/or carbon monoxide sensors is disclosed by Nguyen. An audible alarm activates upon triggering of the sensors. A common fire door opens automatically and a hydraulic animal ejection means gently sweeps or guides the animal out of the kennel through the fire exits.

Conway discloses a system and method for freeing a pet from a portable holding cage in his '714 patent. The portable holding cage is provided with a door that can be locked in a closed position by an electromechanical lock. The operation of the lock is controlled by a systems controller which monitors alarm signals transmitted to it from a remote smoke detector. The transmitted alarm signals can be audible alarm signals, radio alarm signals or optical alarm signals. Once the alarm signal is received and identified by the systems controller, the systems controller activates the lock and opens the door to the holding cage.

Other devices have been developed to overcome these and similar problems associated with the location of a pet in conditions of low visibility. Typical of the art are those devices disclosed in the following U.S. patents:

| U.S. Pat. No. | Inventor(s) | Issue Date |
|---|---|---|
| 5,140,946 | J. F. Pennock et al. | Aug. 25, 1992 |
| 5,523,927 | J. A. Gokey | Jun. 4, 1996 |
| 6,394,040 | W. Axel | May 28, 2002 |
| 6,892,678 | V. Cheng | May 17, 2005 |
| 6,970,090 | M. Sciarra | Nov. 29, 2005 |

Of these patents, Pennock et al., in their '946 patent, disclose an illuminated pet collar including a housing for a battery power source and an elongated transparent display tube having a plurality of spaced apart miniature lights operably connected therein and along substantially the entire length thereof. The housing includes a stem or extension tube extending from each end thereof sized to be snugly inserted into each end of the display tube.

The '927 patent issued to Gokey discloses an illuminated collar including a collar for placement on an animal, at least one light emitting diode (LED) placed on the outer exterior of the collar to be visible when the collar is worn. The LEDs are activated via a motion sensitive switch designed to respond to the motion of the animal. A timing circuit is triggered by the open and closed state of the motion sensitive switch which turns the LEDs off after a predetermined duration, to thereby prevent constant and re-illumination of the light emitting diodes before the motion sensitive switch can change state from open to closed again. An intermittent flashing of the light emitting diodes is established for constant movement. A low battery detection circuit sounds an audible alarm to warn the user of a low battery.

Axel, in her '040 patent, teaches a lighted safety collar for pets including a plurality of light emitting units slidably attached to a strap. Each of the light emitting units includes a housing with a base and a lens formed of a rigid, translucent material. A light control circuit is provided having a battery, a low-power light source, and a switch for selectively operating the light source.

In his '678 patent, Cheng discloses a pet collar capable of reflecting and emitting light to alert vehicle drivers as to the presence of the pet in a poorly-lit place, or at the time of poor visibility. The '678 device includes a strip body, a protective piece, an integrated circuit control board, a printed circuit piece, and a housing. The protective piece is either previous to the light or capable of reflecting light emitted by a motor vehicle or the like. The protective piece is attached to the outer side of the strip body to form a pocket in which the printed circuit piece is contained. The printed circuit piece includes a plurality of LED bulbs and is connected to the integrated circuit control board which is fastened with the strip body in conjunction with the housing.

Finally, Sciarra teaches a pet tracking collar comprising a length of clear flexible tubing having a fastener adapted to fasten around the pet in his '090 patent. Hermetically sealed within the tubing is an electrical ribbon cable extending through the length thereof. A plurality of light-emitting diodes, visible through the clear tubing, is wirelessly connected at spaced intervals to the cable. The tracking collar also includes an antenna within the electrical ribbon cable, and a radio transmitter secured to the cable adapted to transmit a radio frequency signal. A radio frequency signal receiver determines direction or distance of the collar with respect to the receiver.

BRIEF SUMMARY OF THE INVENTION

The present invention is a pet collar for alerting others as to the location of a pet in a situation of low visibility. The pet collar of the present invention is provided for announcing the presence, audibly and visibly, of a pet in a burning structure, especially where the structure is filled with smoke. The pet collar is adapted to work in cooperation with either a conventional or an improved smoke detector. In one embodiment, a radio frequency (RF) transmitter is used in cooperation with a conventional smoke detector to communicate with a pet collar of the present invention. In either embodiment, when the smoke detector detects an event such as the presence of smoke and/or fire such that an audible alarm is sounded, the pet collar is activated to sound an alarm and to illuminate at least one light. The pet collar is also useful in cooperation with other conventional or modified detectors for monitoring other environmental conditions, such as a carbon monoxide detector or a security alarm.

The pet collar is comprised generally of a housing carried on a pet collar and adapted to communicate either directly or indirectly with a smoke detector or other similar detector.

In a first embodiment, the pet collar cooperates directly with a conventional smoke detector. The conventional smoke detector includes a sensor and a processing unit. The sensor is provided for detecting a change in environmental conditions, such as increased smoke content in the ambient air, increased air temperature, increased levels of carbon monoxide, and the like. Upon detection of a change in environmental conditions above a predetermined threshold, the processing unit triggers an audible alarm. The pet collar is provided with circuitry for detecting the conventional smoke detector audible alarm and, in response, generating at least one of an audible alarm and a visual alarm.

The pet collar includes a vibration sensor for detecting vibrations. The vibration sensor is a piezoelectric device. A microphone is provided to sample ambient sounds, simultaneously with the vibration sensor. The output of both the vibration sensor and the microphone are amplified by amplifiers and otherwise conditioned before being passed to a processing unit. The processing unit determines whether the detected sound is that of a conventional smoke detector and, if so, generates the audible and visual alarms.

In the event the conventional smoke alarm fails after sounding an initial alert, the pet collar will continue to sound an alarm and illuminate the LED in order to continue to alert rescue workers as to the location of the pet. Once the pet is located, or in the event of a false alarm, the reset button is actuated in order to reset the processing unit to a standby mode.

In a second embodiment, an RF transmitter is used in cooperation with the conventional smoke detector. The conventional smoke detector is as described above. The RF transmitter includes the vibration sensor, microphone and amplifiers incorporated in the pet collar of the previous embodiment. However, the RF transmitter, upon determining that the conventional smoke alarm has sounded an audible alarm, sends an RF signal to the pet collar, which then sounds generates at least one of an audible and a visual alert, as in the previous embodiment.

The pet collar of this embodiment includes an RF receiver for receiving the RF signal transmitted by the RF transmitter. Upon receipt of the RF signal, an audible alarm is sounded and an LED is illuminated, as described in the previous embodiment. In the preferred embodiment, the audible alarm and visual alarm continue until a reset button is activated, thereby resetting the processing unit to a standby mode.

In a third embodiment, an improved smoke detector communicates directly with the pet collar of the immediately previous embodiment. In this embodiment, the improved smoke detector is provided with an internal RF transmitter which generates an RF signal detectable by the pet collar. When the alarm is sounded, the improved smoke detector simultaneously sends an RF signal to the pet collar, which then sounds generates at least one of an audible and a visual alert, as in the previous embodiment.

The pet collar, and specifically the housing disposed on the pet collar, is configured in any one of various configurations. In one embodiment, the pet collar housing is integrally formed with the pet collar. In a second embodiment, the pet collar housing is a medallion for housing the circuitry of the pet collar. In a third embodiment, the pet collar housing is a wallet type device. In the latter two embodiments, the pet collar housing is adapted to be worn on a conventional collar.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A pet collar for alerting others as to the location of a pet in a situation of low visibility is disclosed. Specifically, the pet collar of the present invention is provided for announcing the presence, audibly and visibly, of a pet in a burning structure, especially where the structure is filled with smoke. The pet collar is adapted to work in cooperation with either a conventional or an improved smoke detector. In one embodiment, a radio frequency (RF) transmitter is used in cooperation with a conventional smoke detector to communicate with a pet collar of the present invention. In either embodiment, when the smoke detector detects an event such as the presence of smoke and/or fire such that an audible alarm is sounded, the pet collar is activated to sound an alarm and to illuminate at least one light. The pet collar is also useful in cooperation with other conventional or modified detectors for monitoring other environmental conditions, such as a carbon monoxide detector or a security alarm.

The pet collar of the present invention is illustrated generally at 10 in the figures. The pet collar 10 is comprised generally of a housing 60 carried on a pet collar 84 and adapted to communicate either directly or indirectly with a smoke detector 12, or other detector as set forth above. While the present invention may be used in cooperation with any conventional environmental detector as disclosed above, for ease of discussion, the present invention will be described as being used in cooperation with a smoke detector, without being limited to a smoke detector.

Figure 1:
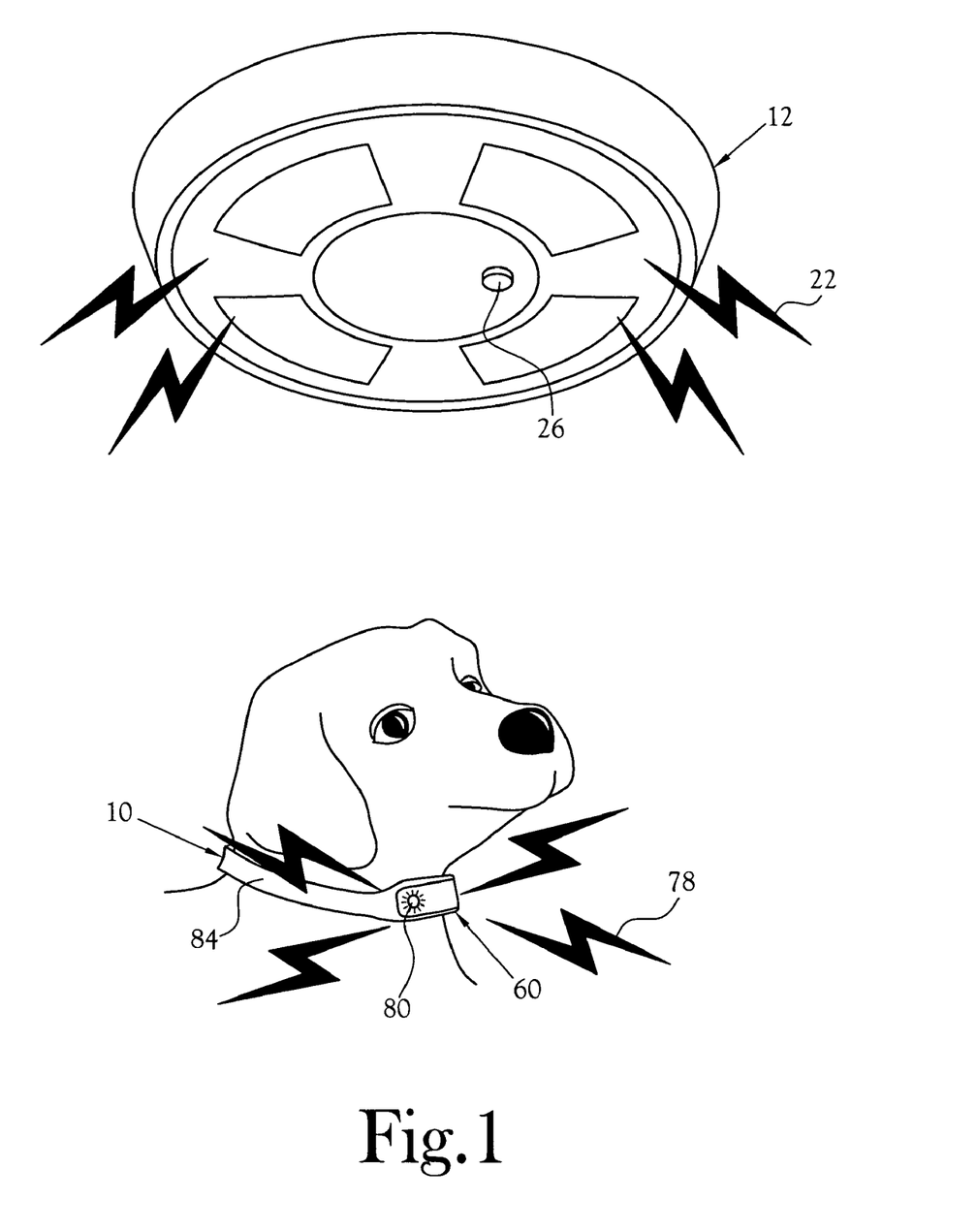
FIG. 1 is a perspective view of a pet collar incorporating various features of the present invention and being used in cooperation with a conventional smoke detector.

Illustrated in FIG. 1 is a pet collar 10 of the present invention used in cooperation with a conventional smoke detector 12. In the conventional smoke detector 12, when a condition is detected such as smoke or fire, an audible alarm 20 is sounded. Typically, conventional smoke detectors 12 sound an alarm in the range of 85 decibels (dB) to 90 dB at a range of 10 feet. Depending on the application, the frequency of the alarm may be in the range of 250 Hz (such as in alarm systems for the hearing impaired) and up to 1500 Hz (such as in commercial or industrial alarms). When the alarm, represented by arrows 22, is sounded, the pet collar 10 detects the alarm and in turn sounds a location alert 76, represented by arrows 78. Further, the pet collar 10 activates a visual alert 80 such as a light in order to create a better potential for seeing the animal as well. The pet collar 10 includes a housing 60 adapted to be worn by an animal on a selected device such as the illustrated collar 84, the housing 60 being provided for protecting the circuitry 62 of the pet collar 10 from the environment.

Figure 2:
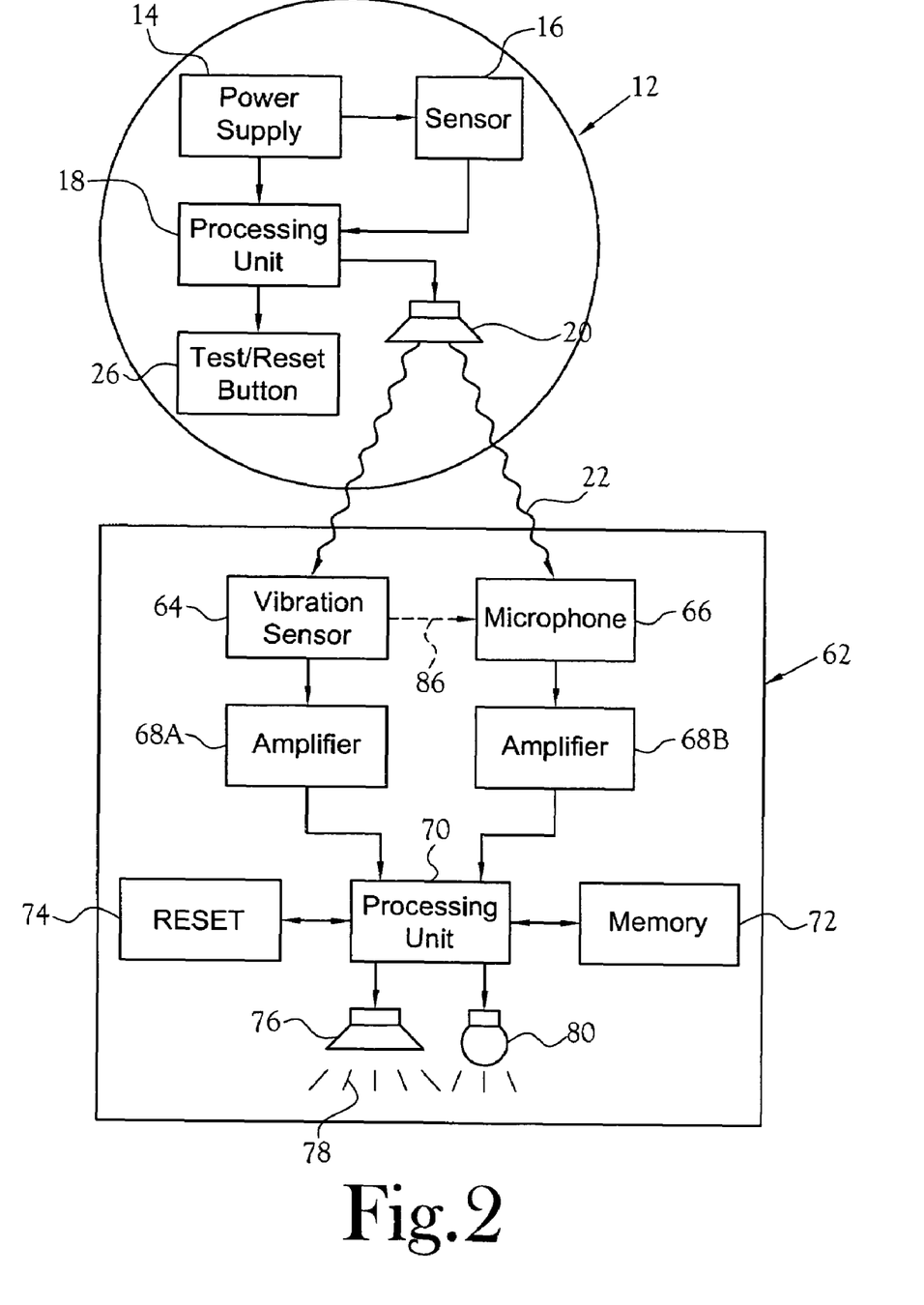
FIG. 2 is a schematic illustration of the pet collar and conventional smoke detector illustrated in FIG. 1.

The embodiment illustrated in FIG. 1 is schematically illustrated in FIG. 2. The conventional smoke detector 12 includes a power supply 14, which can either be alternating current (AC) power supplied via a hardwire installation, or direct current (DC) power supplied via a battery. Power is supplied both to a sensor 16 and a processing unit 18. The sensor 16 is provided for detecting a change in environmental conditions, such as increased smoke content in the ambient air, increased air temperature, increased levels of carbon monoxide, and the like. Upon detection of a change in environmental conditions above a predetermined threshold, the processing unit 18 triggers an audible alarm via a speaker 20.

The housing 60 is illustrated as housing the electrical circuitry 62 of the pet collar. The circuitry 62 includes a vibration sensor 64 for detecting vibrations. The vibration sensor 64 detects vibrations caused by sound waves, and is provided specifically for detecting the audible alarm 22 generated by the conventional smoke detector 12. In the illustrated embodiment, the vibration sensor 64 is a piezoelectric device. A microphone 66 is provided to sample ambient sounds, simultaneously with the vibration sensor 64. The output of both the vibration sensor 64 and the microphone 66 are amplified by amplifiers 68A and 68B, respectively, and otherwise conditioned before being passed to a processing unit 70. The processing unit 70 transforms the contemporaneous sample into vectors and compares those vectors against exemplary vectors representing an audible alarm 22 from a conventional smoke detector 12. If the contemporaneous vectors correspond to the exemplary vectors within predetermined tolerances, in conjunction with the signal detected by the vibration sensor 64, the processing unit 70 generates a positive discrimination result indicating that the sound is a smoke detector audible alarm 22. Upon receipt of a positive discrimination result, at least one of an audible alarm 78 is sounded via a speaker 76 and a light emitting diode (LED) 80 is illuminated. One skilled in the art will recognize that other types of illumination device may be used within the scope of the present invention. It will further be recognized that the LED may be in steady ON state, or may be caused to flash is a selected pattern.

In the preferred embodiment, the vibration sensor 64 operates as a gating device for the microphone 66, as represented by connection 86. When vibrations are sensed by the vibration sensor 64, the microphone 86 is activated for sampling the detected sound. By activating the microphone 66 only when vibrations are sensed, two functions are accomplished. First, false triggers are dramatically reduced and the alert signaling is greatly improved. Second, power usage is reduced corresponding to the minimal activation of the microphone 66.

A memory device 72 is provided for storing an exemplary conventional smoke detector audible alarm 22 for comparison. As previously described, when the vibration sensor 64 detects a vibration indicating that the conventional smoke detector 12 is broadcasting an audible alarm, the microphone 66 is activated to sample the sound. The processing unit 70 discriminates between a conventional smoke detector audible alarm 22 and other ambient sounds. When the discrimination result indicates the sample sound is a conventional smoke detector audible alarm 22, the processing unit 70 compares the conventional smoke detector audible alarm 22 previously stored in the memory device 72 with the sample sound. Should the comparison of the stored conventional smoke detector audible alarm 22 and the contemporaneous sound sample indicate a match, the processing unit 70 generates the audible and visual alarms. Should the comparison of the stored conventional smoke detector audible alarm 22 and the contemporaneous sound sample indicate no match, the microphone 66 is powered OFF.

In the preferred embodiment, the audible alarm 78 and visual alarm 80 continue until a reset button 74 is activated. To this extent, in the event the conventional smoke alarm 12 fails after sounding an initial alert 22, the pet collar 10 continues to sound an alarm 78 and illuminate the LED 80 in order to continue to alert rescue workers as to the location of the pet. Once the pet is located, or in the event of a false alarm, the reset button 74 is actuated in order to reset the processing unit 70 to a standby mode.

Figure 3:
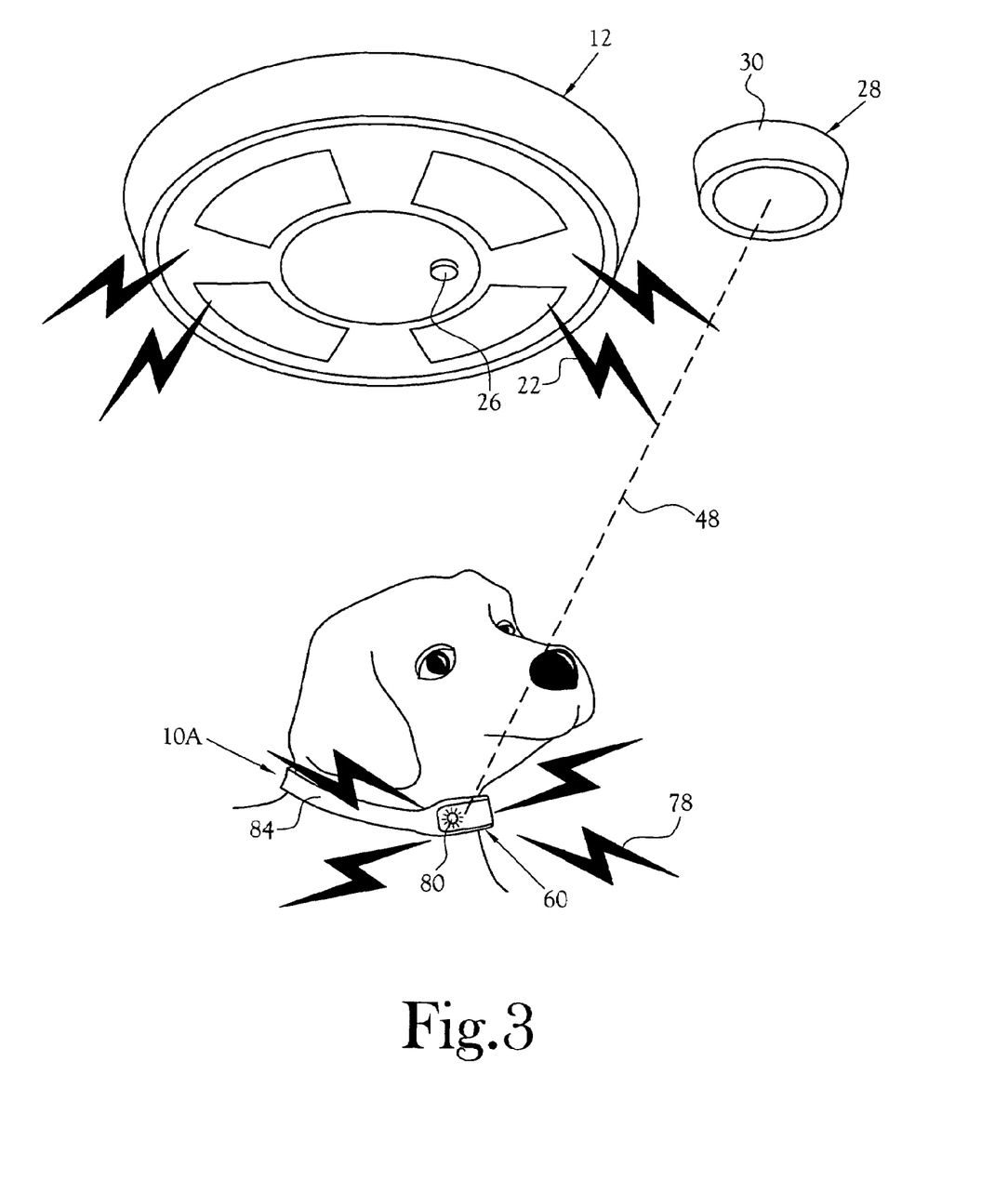
FIG. 3 is a perspective view of an alternate embodiment of a pet collar in communication with an RF transmitter, both constructed in accordance with various features of the present invention and being used in cooperation with a conventional smoke detector.

FIG. 3 illustrates an alternate embodiment of a pet collar 10A in communication with an RF transmitter 28 used in cooperation with a conventional smoke detector 12. The conventional smoke detector 12 is as illustrated in FIG. 1. When the alarm, represented by arrows 22, is sounded, the RF transmitter 28 detects the alarm 22 and in turn sends an RF signal 44 to the pet collar 10A, which then sounds generates at least one of an audible and a visual alert 78, 80, as in the previous embodiment.

Figure 4:
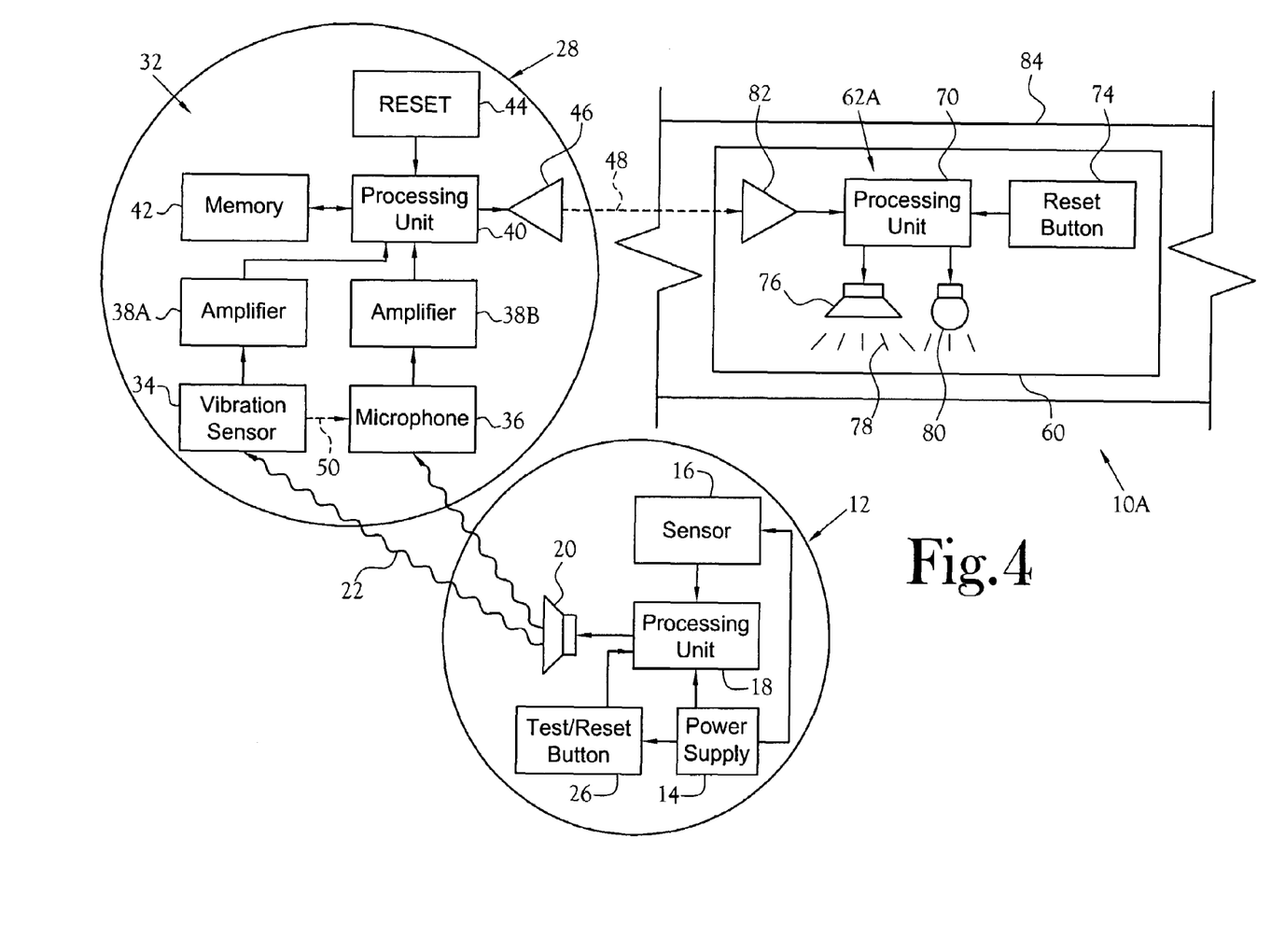
FIG. 4 is a schematic illustration of the pet collar, RF transmitter and conventional smoke detector illustrated in FIG. 3.

The embodiment illustrated in FIG. 3 is schematically illustrated in FIG. 4. The conventional smoke detector 12 is as illustrated schematically in FIG. 2. The RF transmitter 28 is placed in close proximity to the conventional smoke detector 12 in order to best receive the conventional smoke detector audible alarm 22.

The circuitry 32 of the RF transmitter 28 is housed within a housing 30 such as that illustrated in FIG. 3. A vibration sensor 34 is provided for detecting vibrations. The vibration sensor 34 detects vibrations caused by sound waves, and is provided specifically for detecting the audible alarm 22 generated by the conventional smoke detector 12. As in the previous embodiment, the vibration sensor 34 is a piezoelectric device. A microphone 36 is provided to sample ambient sounds, simultaneously with the vibration sensor 34. The output of both the vibration sensor 34 and the microphone 36 are amplified by amplifiers 38A and 38B, respectively, and otherwise conditioned before being passed to a processing unit 40. The processing unit 40 transforms the contemporaneous sample into vectors and compares those vectors against exemplary vectors representing an audible alarm 22 from a conventional smoke detector 12. If the contemporaneous vectors correspond to the exemplary vectors within predetermined tolerances, in conjunction with the signal detected by the vibration sensor 34, the processing unit 40 generates a positive discrimination result indicating that the sound is a smoke detector audible alarm 22. Upon receipt of a positive discrimination result, an RF signal 48 is transmitted via the RF transmitter 46.

As in the previous embodiment, the vibration sensor 34 operates as a gating device for the microphone 36, as represented by connection 50. When vibrations are sensed by the vibration sensor 34, the microphone 36 is activated for sampling the detected sound. A memory device 42 is provided for storing an exemplary conventional smoke detector audible alarm 22 for comparison. When the vibration sensor 34 detects a vibration indicating that the conventional smoke detector 12 is broadcasting an audible alarm 22, the microphone 36 is activated to sample the sound. The processing unit 40 discriminates between a conventional smoke detector audible alarm 22 and other ambient sounds. When the discrimination result indicates the sample sound is a conventional smoke detector audible alarm 22, the processing unit 40 compares the conventional smoke detector audible alarm 22 previously stored in the memory device 42 with the sample sound. Should the comparison of the stored conventional smoke detector audible alarm 22 and the contemporaneous sound sample indicate a match, the processing unit 40 generates the RF signal 48. Should the comparison of the stored conventional smoke detector audible alarm 22 and the contemporaneous sound sample indicate no match, the microphone 36 is powered OFF.

The pet collar 110A includes a housing 60 as illustrated in FIG. 3 for housing the circuitry 62A thereof. An RF receiver 82 is provided for receiving the RF signal 48 transmitted by the RF transmitter 46. Upon receipt of the RF signal 48, an audible alarm 78 via a speaker 74 is sounded and an LED 80 is illuminated, as described in the previous embodiment. In the preferred embodiment, the audible alarm 78 and visual alarm 80 continue until a reset button 74 is activated, thereby resetting the processing unit 70 to a standby mode.

Figure 5:
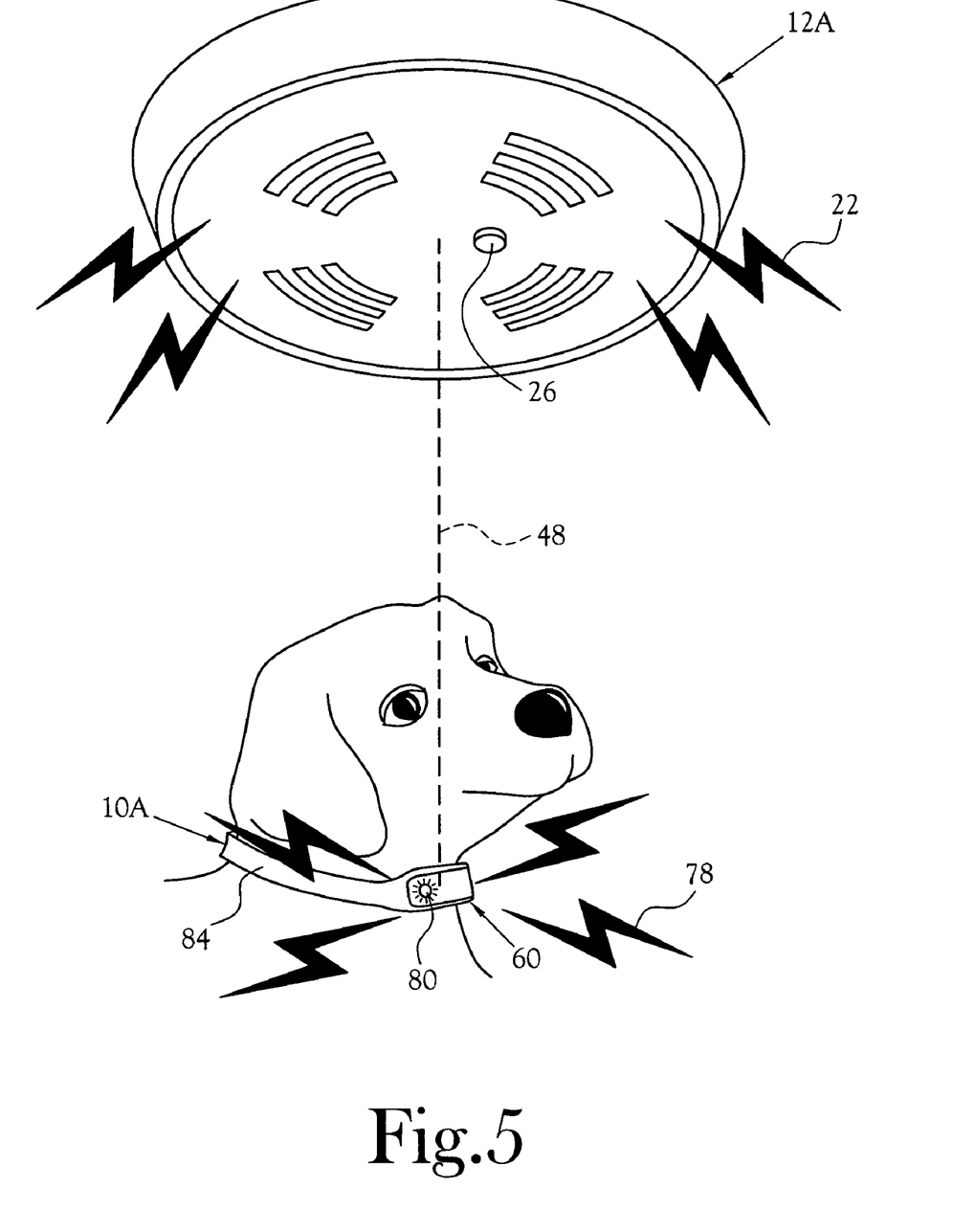
FIG. 5 is a perspective view of a further alternate embodiment of a pet collar in communication with an improved smoke detector RF transmitter, both constructed in accordance with various features of the present invention.

FIG. 5 illustrates the alternate embodiment of the pet collar 10A in communication with an improved smoke detector 12A. The improved smoke detector 12A, in addition to sounding an audible alarm 22, further generates an RF signal 48 which is detectable by the pet collar 10A. When the alarm, represented by arrows 22, is sounded, the improved smoke detector 12A simultaneously sends the RF signal 48 to the pet collar 10A, which then sounds generates at least one of an audible and a visual alert 78, 80, as in the previous embodiment.

Figure 6:
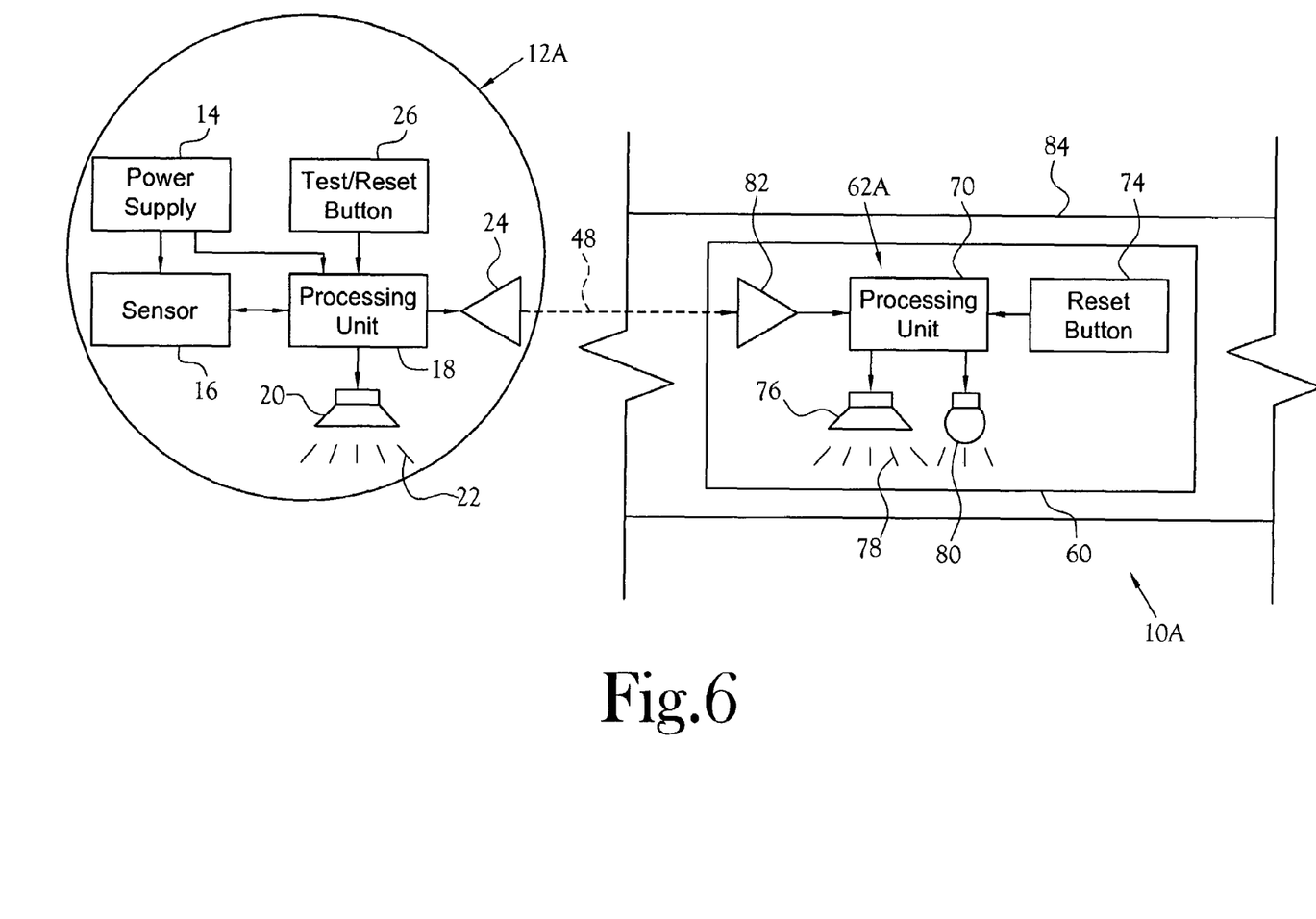
FIG. 6 is a schematic illustration of the pet collar and improved smoke detector illustrated in FIG. 5.

The embodiment illustrated in FIG. 5 is schematically illustrated in FIG. 6. The improved smoke detector 12A includes the components included in the conventional smoke detector 12 as illustrated schematically in FIG. 2. The improved smoke detector 12A further includes an RF transmitter 24 provided for simultaneously broadcasting an RF signal 48 with the audible alarm 22. The pet. collar 10A used in association with the improved smoke detector 12A is the same as in the immediately previous embodiment schematically illustrated in FIG. 4.

Figure 7:
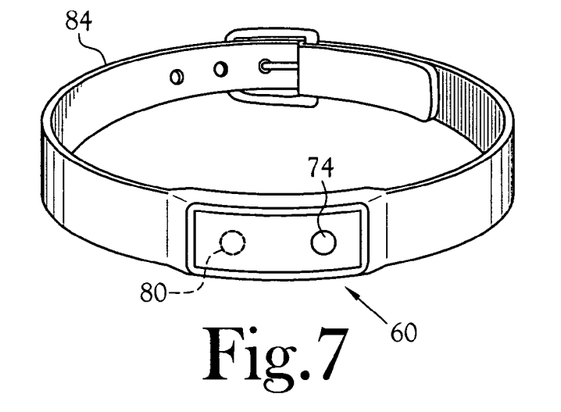
FIG. 7 is a perspective view of one embodiment of a pet collar incorporating various features of the present invention.
Figure 8:
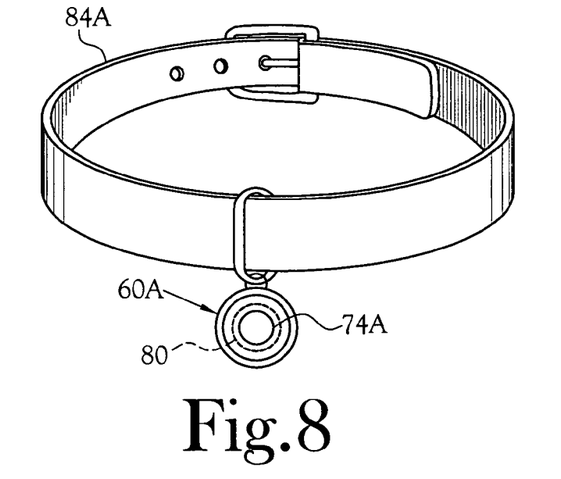
FIG. 8 is a perspective view of an alternate embodiment a pet collar of the present invention including a medallion adapted to be worn on a conventional collar.
Figure 9:
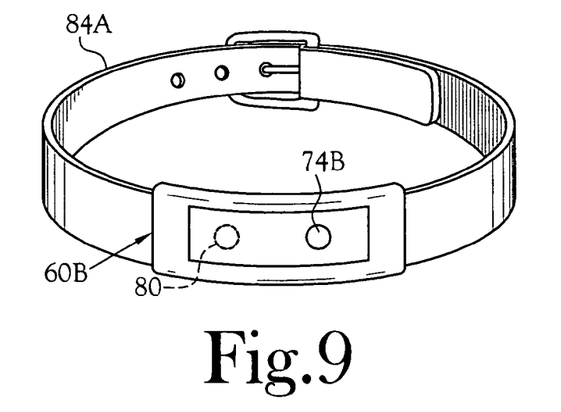
FIG. 9 is a perspective view of a further alternate embodiment of a pet collar of the present invention including a wallet type device adapted to be worn on a conventional collar.

FIG. 7 illustrated one configuration of the pet collar 10 of the present invention. In this embodiment, the pet collar housing 60 is integrally formed with the pet collar 84. In FIG. 8, the illustrated embodiment of the pet collar housing 60A is a medallion for housing the circuitry 62 of the pet collar 10. In this embodiment, the medallion is adapted to be used with any conventional collar 84A. Similarly, in FIG. 9, the pet collar housing 60B is a wallet type device adapted to be worn on a conventional collar 84A. It will be understood by those skilled in the art that the pet collar housing 60 may be configured in any of these or other configurations. Accordingly, the present invention is not limited to those embodiments illustrated.

In each of the various embodiments of the present invention, a smoke detector 12 is used to detect the presence of smoke, elevated temperature, or other environmental danger, and to broadcast an audible alarm 22. In two of the illustrated embodiments, an RF signal 48—either internal to the smoke detector 12A or external via an RF transmitter 28—is generated to be received by the pet collar 10A. The pet collar 10 receives either or both of the audible alarm 22 and the RF signal 48 and, in turn, generates either or both of an audible alarm 78 and a visual alarm 80. Thus, in the event a pet is trapped in a situation where, for whatever reason, the pet is not easily seen, the audible alarm 78 alerts a rescue worker or caretaker as to the location of the animal. In situations of low visibility, the visual alarm 80 assists further in locating the animal, especially when ambient noise levels make hearing the audible alarm 78 difficult.

While the present invention has been described as being useful in locating a pet in the event of an emergency, it will be understood that the present invention as described is further useful for locating a pet in non-emergency situations as well. To this extent, in the event a pet owner is unable to locate a pet in a non-emergency situation, the pet owner triggers the smoke detector 12 by either pressing the reset button 26, which also functions as a test button, or by creating smoke proximate the smoke detector 12 such as by lighting a match and holding it near the smoke detector 12. In those embodiments using a conventional smoke detector 12, the brief audible alarm 22 generated either directly or indirectly causes the audible alarm 78 and the visual alarm 80 to be actuated. In the embodiment wherein an improved smoke detector 12A is incorporated, the RF signal 48 is generated when the smoke detector 12A is "tested," thereby actuating the audible alarm 78 and the visual alarm 80. In either situation, when the audible alarm 78 and the visual alarm 80 are actuated, the pet owner is assisted in locating the pet and, once located, actuates the reset button 74 of the pet collar 10.

The pet collar 10 of the illustrated embodiment is a collar adapted to be worn around the neck of a pet. However, it will be understood by those skilled in the art that the inventive features of the present invention may also be incorporated in a harness or other device configured to be worn by the pet.

Further, while the present invention has been illustrated and described as being worn on a pet, it will be understood by those skilled in the art that the present invention may also be adapted to be worn by a person. For example, the present invention may be worn by a person who does not have the ability to communicate well, by the elderly, or by those who may have tendencies to become disoriented, or who may have medical conditions such as epilepsy, Alzheimer's disease, or Downs Syndrome.

From the foregoing description, it will be recognized by those skilled in the art that a pet collar for alerting others as to the location of a pet in a situation of low visibility has been provided. The pet collar of the present invention is provided for announcing the presence, audibly and visibly, of a pet in a burning structure, especially where the structure is filled with smoke. The pet collar is adapted to work in cooperation with either a conventional or an improved smoke detector. An RF transmitter may be used in cooperation with a conventional smoke detector, or incorporated into an improved smoke detector, to communicate with the pet collar via RF signals. In either embodiment, when the smoke detector detects an event such as the presence of smoke and/or fire such that an audible alarm is sounded, the pet collar is activated to sound an alarm and to illuminate at least one light. The pet collar is also useful in cooperation with other conventional or modified detectors for monitoring other environmental conditions, such as a carbon monoxide detector or a security alarm.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. A pet locator for locating an animal, said pet locator being used in cooperation with a conventional alarm device configured to produce an audible alarm when a hazardous environmental condition is detected, said pet locator comprising:
    a housing adapted to be worn by an animal; and
    circuitry received within said housing, said circuitry for communicating with the conventional alarm device and generating at least one of an audible alarm and a visual alarm when the conventional alarm device produces an audible alarm.

2. The pet locator of claim 1 wherein said circuitry includes a processor for discriminating between the audible alarm of the conventional alarm device and other ambient noises, whereby said circuitry generates said at least one of a pet locator audible alarm and a visual alarm only when the conventional alarm device generates the conventional alarm device audible alarm.

3. The pet locator of claim 2 wherein said circuitry further includes:
    a vibration sensor for detecting vibrations;
    a microphone for sampling ambient sounds simultaneously with said vibration sensor, said vibration sensor operating as a gating device for said microphone;
    a memory unit for storing an exemplary conventional alarm device audible alarm, said processor comparing a sound sample with the exemplary conventional alarm device audible alarm, said processor generating at least one of said pet locator audible alarm and said visual alarm when said sound sample is confirmed as a conventional alarm device audible alarm; and
    at least one of a speaker for emitting said pet locator audible alarm and at least one illumination device for producing said visual alarm.

4. The pet locator of claim 3 wherein said vibration sensor is a piezoelectric device.

5. The pet locator of claim 1 further comprising an RF transmitter in communication with the conventional alarm device and with said pet locator circuitry, said RF transmitter including a processor for discriminating between the audible alarm of the conventional alarm device and other ambient noises, whereby said RF transmitter signals said pet locator circuitry to generate said at least one of a pet locator audible alarm and a visual alarm when the conventional alarm device generates the conventional alarm device audible alarm.

6. The pet locator of claim 5 wherein said RF transmitter circuitry further includes:
    a vibration sensor for detecting vibrations;
    a microphone for sampling ambient sounds simultaneously with said vibration sensor, said vibration sensor operating as a gating device for said microphone;
    a memory unit for storing an exemplary conventional alarm device audible alarm, said processor comparing a sound sample with the exemplary conventional alarm device audible alarm; and
    an RF transmitter for transmitting an RF signal when said sound sample is confirmed as a conventional alarm device audible alarm; and
wherein said pet locator circuitry includes:
    an RF receiver for receiving said RF signal;
    a processor for generating at least one of said pet locator audible alarm and said visual alarm when said RF signal is received; and
    at least one of a speaker for emitting said pet locator audible alarm and at least one illumination device for producing said visual alarm.

7. The pet locator of claim 6 wherein said vibration sensor is a piezoelectric device.

8. The pet locator of claim 1 wherein said housing is integrally formed with a pet collar.

9. The pet locator of claim 1 wherein said housing defines a medallion-type configuration adapted to be carried by a conventional pet collar.

10. The pet locator of claim 1 wherein said housing defines a wallet-type configuration adapted to be carried by a conventional pet collar.

11. A pet locator for locating an animal, said pet locator comprising:
    an alarm device configured to produce an audible alarm when a hazardous environmental condition is detected;
    a housing adapted to be worn by an animal; and
    circuitry received within said housing, said circuitry for communicating with the alarm device and generating at least one of an audible alarm and a visual alarm when the alarm device produces an audible alarm.

12. The pet locator of claim 11 wherein said circuitry includes a processor for discriminating between said audible alarm of said alarm device and other ambient noises, whereby said circuitry generates said at least one of a pet locator audible alarm and a visual alarm only when said alarm device generates said alarm device audible alarm.

13. The pet locator of claim 12 wherein said circuitry further includes:
    a vibration sensor for detecting vibrations;
    a microphone for sampling ambient sounds simultaneously with said vibration sensor, said vibration sensor operating as a gating device for said microphone;
    a memory unit for storing an exemplary alarm device audible alarm, said processor comparing a sound sample with said exemplary alarm device audible alarm, said processor generating at least one of said pet locator audible alarm and said visual alarm when said sound sample is confirmed as a alarm device audible alarm; and
    at least one of a speaker for emitting said pet locator audible alarm and at least one illumination device for producing said visual alarm.

14. The pet locator of claim 13 wherein said vibration sensor is a piezoelectric device.

15. The pet locator of claim 11 further comprising an RF transmitter in communication with said alarm device and with said pet locator circuitry, said RF transmitter including a processor for discriminating between said audible alarm of said alarm device and other ambient noises, whereby said RF transmitter signals said pet locator circuitry to generate said at least one of a pet locator audible alarm and a visual alarm when the alarm device generates the alarm device audible alarm.

16. The pet locator of claim 15 wherein said RF transmitter circuitry further includes:
    a vibration sensor for detecting vibrations;
    a microphone for sampling ambient sounds simultaneously with said vibration sensor, said vibration sensor operating as a gating device for said microphone;
    a memory unit for storing an exemplary conventional alarm device audible alarm, said processor comparing a sound sample with the exemplary alarm device audible alarm; and
    an RF transmitter for transmitting an RF signal when said sound sample is confirmed as a alarm device audible alarm; and
wherein said pet locator circuitry includes:
    an RF receiver for receiving said RF signal;
    a processor for generating at least one of said pet locator audible alarm and said visual alarm when said RF signal is received; and
    at least one of a speaker for emitting said pet locator audible alarm and at least one illumination device for producing said visual alarm.

17. The pet locator of claim 16 wherein said vibration sensor is a piezoelectric device.

18. The pet locator of claim 11 wherein said alarm device includes:
    a sensor for detecting an environmental hazard;
    a processing unit for initiating at least an audible alarm and an RF signal; and
    an RF transmitter for transmitting said RF signal; and
wherein said pet locator circuitry includes:
    an RF receiver for receiving said RF signal;
    a processor for generating at least one of said pet locator audible alarm and said visual alarm when said RF signal is received; and
    at least one of a speaker for emitting said pet locator audible alarm and at least one illumination device for producing said visual alarm.

19. The pet locator of claim 11 wherein said housing is integrally formed with a pet collar.

20. The pet locator of claim 11 wherein said housing defines a medallion-type configuration adapted to be carried by a conventional pet collar.

21. The pet locator of claim 11 wherein said housing defines a wallet-type configuration adapted to be carried by a conventional pet collar.

22. A pet locator for locating an animal, said pet locator comprising:
    an alarm device configured to produce an audible alarm when a hazardous environmental condition is detected, said alarm device including:
        a sensor for detecting an environmental hazard;

a processing unit for initiating at least an audible alarm and an RF signal; and an RF transmitter for transmitting said RF signal;

a housing adapted to be worn by an animal; and circuitry received within said housing, said circuitry for communicating with said alarm device and generating at least one of an audible alarm and a visual alarm when the alarm device produces an audible alarm, said circuitry including:

an RF receiver for receiving said RF signal;

a processor for generating at least one of said pet locator audible alarm and said visual alarm when said RF signal is received; and at least one of a speaker for emitting said pet locator audible alarm and at least one illumination device for producing said visual alarm.

23. The pet locator of claim 22 wherein said housing is integrally formed with a pet collar.

24. The pet locator of claim 22 wherein said housing defines a medallion-type configuration adapted to be carried by a conventional pet collar.

25. The pet locator of claim 22 wherein said housing defines a wallet-type configuration adapted to be carried by a conventional pet collar.

* * * * *